US009898112B2

(12) United States Patent
Wang et al.

(10) Patent No.: US 9,898,112 B2
(45) Date of Patent: Feb. 20, 2018

(54) DISPLAY MODULE AND ELECTRONIC TERMINAL

(75) Inventors: Zhuqiang Wang, Beijing (CN); Xiang Shao, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 90 days.

(21) Appl. No.: 14/131,094

(22) PCT Filed: Jun. 27, 2012

(86) PCT No.: PCT/CN2012/077610
§ 371 (c)(1),
(2), (4) Date: Jan. 6, 2014

(87) PCT Pub. No.: WO2013/007149
PCT Pub. Date: Jan. 17, 2013

(65) Prior Publication Data
US 2014/0146248 A1    May 29, 2014

(30) Foreign Application Priority Data
Jul. 12, 2011    (CN) .......................... 2011 1 0194818

(51) Int. Cl.
*G09G 5/00*    (2006.01)
*G06F 3/041*    (2006.01)
(Continued)

(52) U.S. Cl.
CPC ........... *G06F 3/041* (2013.01); *G02B 6/0076* (2013.01); *G02F 1/1347* (2013.01);
(Continued)

(58) Field of Classification Search
CPC ........ G06F 3/041; G06F 3/042; G06F 3/0421; G06F 3/0423; G06F 3/0425; G06F 3/0426; G06F 3/0428
See application file for complete search history.

(56) References Cited

U.S. PATENT DOCUMENTS 8,537,138 B2 * 9/2013 Tsang .................... G06F 3/0428
345/175
2004/0263425 A1 * 12/2004 Anzai et al. .................. 345/1.1
(Continued)

FOREIGN PATENT DOCUMENTS

| CN | 1664852 A | 7/2005 |
| CN | 1664852 A | 9/2005 |

(Continued)

OTHER PUBLICATIONS

English translation of Abstract of Chinese Patent No. 1664852 A.
(Continued)

*Primary Examiner* — Kent Chang
*Assistant Examiner* — William Lu

(57) ABSTRACT

The present invention provides a display module (100; 200) and an electronic terminal. The display module (100; 200) comprises: a first display unit (130; 240) configured to display first image information in a first direction; a second display unit (140; 250) configured to display second image information in a second direction; and a sensor unit (150; 260) provided between the first display unit (130; 240) and the second display unit (140; 250) and configured to sense an object's approach or touch on the first display unit (130; 240) and/or the second display unit (140; 250). With the display module (100; 200), the object's approach or touch on the first display unit (130; 240) and the second display unit (140; 250) can be sensed by a single sensor unit (150; 260). There is no need to provide a sensor unit (150; 260) for each of the display units (130; 240; 140; 250) for touch sensing (Continued)

function. In this way, it is possible to reduce the thickness of the display module (100; 200), make it slimmer and more beautiful while reducing manufacture cost.

7 Claims, 3 Drawing Sheets

(51) Int. Cl.
*G06F 3/045* (2006.01)
*G09G 3/34* (2006.01)
*G09G 3/16* (2006.01)
*G09G 5/14* (2006.01)
*G06F 1/16* (2006.01)
*G02F 1/1333* (2006.01)
*G02F 1/1347* (2006.01)
*F21V 8/00* (2006.01)

(52) U.S. Cl.
CPC ........ *G02F 1/13338* (2013.01); *G06F 1/1641* (2013.01); *G09G 3/16* (2013.01); *G09G 3/3473* (2013.01); *G09G 5/14* (2013.01); *G02F 2001/133342* (2013.01)

(56) References Cited

U.S. PATENT DOCUMENTS

| | | | |
|---|---|---|---|
| 2005/0024844 A1* | 2/2005 | Oh | G02B 6/0063 362/616 |
| 2005/0157224 A1* | 7/2005 | Kanbe | G02F 1/133536 349/96 |
| 2005/0264190 A1* | 12/2005 | Park et al. | 313/506 |
| 2006/0012876 A1* | 1/2006 | Choi | G03B 21/625 359/452 |
| 2006/0034042 A1* | 2/2006 | Hisano et al. | 361/681 |
| 2006/0066783 A1* | 3/2006 | Sampsell | 349/114 |
| 2006/0121961 A1* | 6/2006 | Cho | 455/575.3 |
| 2006/0146573 A1* | 7/2006 | Iwauchi | G02B 6/0018 362/621 |
| 2006/0262568 A1* | 11/2006 | Blom et al. | 362/625 |
| 2008/0112189 A1* | 5/2008 | Okuda | 362/617 |
| 2010/0039395 A1* | 2/2010 | Nurmi et al. | 345/173 |
| 2010/0302194 A1* | 12/2010 | Park et al. | 345/173 |
| 2011/0007047 A1* | 1/2011 | Fujioka et al. | 345/207 |
| 2011/0105189 A1* | 5/2011 | Lee et al. | 455/566 |
| 2011/0261058 A1* | 10/2011 | Luo | 345/441 |
| 2012/0069600 A1* | 3/2012 | Lin et al. | 362/616 |
| 2012/0086655 A1* | 4/2012 | Wang et al. | 345/173 |
| 2012/0163021 A1* | 6/2012 | Bohn et al. | 362/608 |
| 2012/0212445 A1* | 8/2012 | Heikkinen et al. | 345/174 |
| 2013/0076249 A1* | 3/2013 | Chuang et al. | 315/152 |

FOREIGN PATENT DOCUMENTS

| | | |
|---|---|---|
| CN | 1769959 A | 10/2006 |
| CN | 1871576 A | 11/2006 |
| CN | 100389380 C | 5/2008 |
| CN | 100432753 C | 11/2008 |
| CN | 201616046 U | 10/2010 |
| KR | 10-2010-0044626 | 4/2010 |
| TW | 200705003 A | 2/2007 |

OTHER PUBLICATIONS

English translation of Abstract of Chinese Patent No. 201616046 U.
English translation of Abstract of Chinese Patent No. 1769959 A.
English translation of Abstract of Korean Patent No. 20100044626 A.
English translation of Abstract of Chinese Patent No. 100389380 C.
Eng. Abstract of CN1871576A from related PCT/US04/30731 Priority Document (1pg.).
CN office action 201110194818.8 dated Jan. 24, 2014 (8 pgs.).
Eng. Abstract of CN1664852A (1pg.).

* cited by examiner

DISPLAY MODULE AND ELECTRONIC TERMINAL

CROSS REFERENCE TO RELATED APPLICATIONS

This application is based on International Application No. PCT/CN2012/077610 filed on Jun. 27, 2012, which claims priority to Chinese National Application No. 201110194818.8, filed on Jul. 12, 2011, the contents of which are incorporated herein by reference.

TECHNICAL FIELD

The present invention relates to electronic device technology, and more particularly, to display modules and electronic terminals.

BACKGROUND

To enable a user to view a display from more than one view angle, display manufacturers have developed a double-sided display. That is, two one-sided display screens are combined in a back-to-back manner, such that different images can be displayed on the two opposite sides. Further, to use such display in a more convenient way, a touch sensing layer can be provided on each side of the double-sided display screen to enable touch function on each of the screens.

For a traditional touch screen, the touch sensing layer is typically provided on a surface of the screen. For a double-sided display, a touch sensing layer is required on each of the display screens. Due to the configuration of two display units and two touch sensing layers of the double-sided display, it is difficult to manufacture a thin and light display with good appearance and low cost.

SUMMARY

It is an object of the present invention to provide a display module and an electronic terminal, capable of reducing overall thickness of a display having two layers of touch screens while making the display slimmer and more beautiful.

According to an aspect of the present invention, a display module is provided. The display module comprises: a first display unit configured to display first image information in a first direction; a second display unit configured to display second image information in a second direction; and a sensor unit provided between the first display unit and the second display unit and configured to sense an object's approach or touch on the first display unit and/or the second display unit.

Preferably, the display module further comprises: a light emitting unit configured to emit light towards a first area; and a light guiding unit provided in the first area and configured to guide the light emitted from the light emitting unit to a second area corresponding to the first direction and a third area corresponding to the second direction. The first display unit is provided in the second area and configured to display the first image information with the light guided to the second area by the light guiding unit. The second display unit is provided in the third area and configured to display the second image information with the light guided to the third area by the light guiding unit.

Preferably, the light guiding unit comprises a light guiding plate. The first display unit is provided on a first side of the light guiding plate towards the first direction and the second display unit is provided on a second side of the light guiding plate towards the second direction. The light emitting unit is provided at an end surface of the light guiding plate that is different from the first side and the second side.

Preferably, the sensor unit is provided between the light guiding unit and the first display unit, or between the light guiding unit and the second display unit.

Preferably, the display module comprises a first material layer provided on a first surface of the light guiding plate towards the first direction, and having a light transmittance higher than a predetermined light transmittance in a power on state and a light transmittance lower than the predetermined light transmittance in a power off state; and a second material layer provided on a second surface of the light guiding plate that faces towards the second direction, and having a light transmittance higher than a predetermined light transmittance in a power on state and a light transmittance lower than the predetermined light transmittance in a power off state.

Preferably, the display module comprises an adjusting unit configured to control the power on state and the power off state of each of the first material layer and the second material layer. The adjusting unit is configured to control, in response to a first control command, the first material layer to enter the power on state, the second material layer to enter the power off state and the light guiding plate to guide the light emitted from the light emitting unit to the second area, and to control, in response to a second control command, the second material layer to enter the power on state, the first material layer to enter the power off state and the light guiding plate to guide the light emitted from the light emitting unit to the third area.

Preferably, the light guiding unit comprises a first light guiding plate and a second light guiding plate. A distance between the first light guiding plate and the first display unit is shorter than a distance between the second light guiding plate and the first display unit. A distance between the second light guiding plate and the second display unit is shorter than a distance between the first light guiding plate and the second display unit. The first light guiding plate is configured to guide the light emitted from the light emitting unit to the second area, and the second light guiding plate is configured to guide the light emitted from the light emitting unit to the third area. The light emitting unit is provided at an end surface of the first light guiding plate or the second light guiding plate.

Preferably, the sensor unit is provided between the first light guiding plate and the second light guiding plate.

Preferably, the display module comprises a moving mechanism connected to the light emitting unit and configured to cause the light emitting unit to move. The moving mechanism causes the light emitting unit to move to the first light guiding plate in response to a third control command and causes the light emitting unit to move to the second light guiding plate in response to a fourth control command.

According to another aspect of the present invention, an electronic terminal is provided. The electronic terminal comprises: a host comprising at least one processing unit; a display comprising: a first display unit configured to display first image information in a first direction upon receiving a first data from a first processing unit of the at least one processing unit; a second display unit configured to display second image information in a second direction upon receiving a second data from a second processing unit of the at least one processing unit; and a sensor unit provided between the first display unit and the second display unit and configured to obtain operation data for an object's approach or touch on the first display unit and/or the second display unit and transmit the operation data to a third processing unit of the at least one processing unit.

Preferably, the display further comprises: a light emitting unit configured to emit light towards a first area; and a light guiding unit provided in the first area and configured to guide the light emitted from the light emitting unit to a second area corresponding to the first direction and a third area corresponding to the second direction. The first display unit is provided in the second area and configured to display the first image information with the light guided to the second area by the light guiding unit. The second display unit is provided in the third area and configured to display the second image information with the light guided to the third area by the light guiding unit.

Preferably, in the electronic terminal, the light guiding unit comprises a light guiding plate. The first display unit is provided on a first side of the light guiding plate towards the first direction and the second display unit is provided on a second side of the light guiding plate towards the second direction. The light emitting unit is provided at an end surface of the light guiding plate that is different from the first side and the second side.

Preferably, in the electronic terminal, the sensor unit is provided between the light guiding unit and the first display unit, or between the light guiding unit and the second display unit.

Preferably, in the electronic terminal, the host is configured to execute a first operating system and/or a second operating system. When the host executes the first operating system, the first display unit is configured to display an operation result of the first operating system in the first direction. When the host executes the second operating system, the second display unit is configured to display an operation result of the second operating system in the second direction.

Preferably, in the electronic terminal, when the host executes the first operating system, the sensor unit is configured to sense the object's approach or touch on the first display unit, and the first operating system responds to the object's approach or touch. When the host executes the second operating system, the sensor unit is configured to sense the object's approach or touch on the second display unit, and the second operating system responds to the object's approach or touch.

Preferably, the electronic terminal further comprises a connecting unit configured to connect the host with the display, wherein the display has a first relative position relationship with the host when the connecting unit is in a first connection state or a second relative position relationship with the host when the connecting unit is in a second connection state; a detecting unit configured to detect the relative position relationship between the host and the display and generate a first detection result upon detecting the first relative position relationship or a second detection result upon detecting the second relative position relationship; and a fourth processing unit in the at least one processing unit, connected to the detecting unit and configured to switch the electronic terminal to a first operation state based on the first detection result or a second operation state based on the second detection result. The first operation state is an operation state in which the first operating system is a primary operating system and the first display unit displays the operation result of the first operating system and the second operation state is an operation state in which the second operating system is the primary operating system and the second display unit displays the operation result of the second operating system.

Embodiments of the present invention have at least one of the following advantageous effects. The object's approach or touch on the first display unit and the second display unit can be sensed by a single sensor unit. There is no need to provide a sensor unit for each of the display units for the touch sensing function. In this way, it is possible to reduce the thickness of the display module, and thus make it slimmer and more beautiful while reducing its manufacture cost. Further, with two display units, the electronic terminal can be switched between a first operation state in which the first operating system is the primary operating system and a second operation state in which the second operating system is the primary operating system. Therefore, the terminal can be switched between different states seamlessly.

DETAILED DESCRIPTION OF THE EMBODIMENTS

Figure 1:
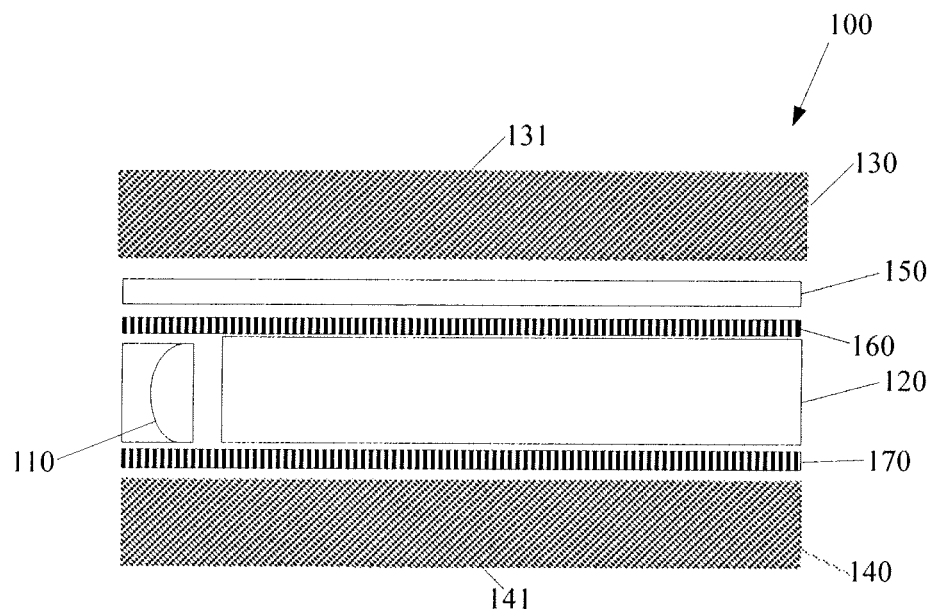
FIG. 1 is a schematic diagram of a first configuration of a display module according to a first embodiment of the present invention.

The present invention will be described in detail with reference to embodiments and figures, such that the objects, solutions and advantages of the present invention will become more apparent.

With the display module and the electronic terminal according to embodiments of the present invention, an object's approach or touch on the first display unit and the second display unit can be sensed by a single sensor unit. There is no need to provide a sensor unit for each of the display units for touch sensing function. In this way, it is possible to reduce the thickness of the display module, and thus make it slimmer and more beautiful while reducing manufacture cost.

According to an embodiment of the present invention, a display module includes: a first display unit configured to display first image information in a first direction; a second display unit configured to display second image information in a second direction; and a sensor unit provided between the first display unit and the second display unit and configured to sense an object's approach or touch on the first display unit and/or the second display unit.

Here, the first direction is different from the second direction. In a preferred embodiment of the present invention, in the display module, the first direction and the second direction are opposite to each other, and the first display unit and the second display unit display images in opposite directions. However, the first direction and the second direction are not limited thereto.

The first display unit and the second display unit can be display units of the same type, for example, operating in the same display principle and/or having the same size. Alternatively, the first display unit and the second display unit can be different display units for example, operating in different display principles and/or having different sizes. Each of the first display unit and the second display unit can be a display unit operating in any display principle, such as e-paper without light source or a display unit with light source, like Liquid Crystal Display (LCD) with backlight source, Light Emitting Diode (LED) display and e-paper with a front light source.

The sensor unit may employ a capacitive sensing principle to detect approach or touch by an object (such as a finger or another conductor). Any other appropriate sensor unit may also be used.

Further, according to an embodiment, the display module further includes: a light emitting unit configured to emit light towards a first area; and a light guiding unit provided in the first area and configured to guide the light emitted from the light emitting unit to a second area corresponding to the first direction and a third area corresponding to the second direction. The first display unit is provided in the second area and configured to display the first image information with the light guided to the second area by the light guiding unit. The second display unit is provided in the third area and configured to display the second image information with the light guided to the third area by the light guiding unit.

With such configuration of the light emitting unit and light guiding unit in the display module, the light emitted from the light emitting unit can be guided to the first display unit and/or the second display unit by the light guiding unit, such that the first display unit and the second display unit can display images with the light emitted from the light emitting unit.

FIG. 1 is a schematic diagram of configuration of a display module 100 according to a first embodiment of the present invention. Referring to FIG. 1, the display module includes a light emitting unit 110, a light guiding unit, a first display unit 130, a second display unit 140 and a sensor unit 150.

The light emitting unit 110 may include one or more LED light sources.

The light guiding unit may include a light guiding plate 120. The light emitting unit 110 is provided at an end surface of the light guiding plate 120. Preferably, the light guiding plate 120 is a thin plate, and the LED light sources of the light emitting unit 110 may be provided on one or more end surfaces of the light guiding plate 120. For example, as can be appreciated by those skilled in the art, the light guiding plate 120, which is a thin plate, may have four end surfaces, and the LED light sources may be provided on any of the end surfaces. The LED light sources of the light emitting unit 110 may face an end surface such that the light emitting unit 110 may emit light to an area where the end surface is located (i.e., a first area). The emitted light is transmitted to the light guiding plate 120, which may guide the light emitted from the light emitting unit 110 towards a first direction and a second direction, such that the light guided towards the first direction irradiates a second area and the light guided towards the second direction irradiates a third area.

The first display unit 130 is provided on a first side of the light guiding plate 120 in the first direction towards which the light is guided. The second display unit 140 is provided on a second side of the light guiding plate 120 in the second direction towards which the light is guided. The light emitting unit 110 is provided at a position different from the first side and the second side with respect to the light guiding plate 120. In an embodiment of the present invention, as shown in FIG. 1, the first direction and the second direction are opposite directions with respect to the light guiding plate 120.

In the display module 100 according to the first embodiment of the present invention, the sensor unit 150 is provided between the light guiding unit and the first display unit 130, i.e., between the light guiding unit 120 and the first display unit 130 as shown in FIG. 1. Alternatively, the sensor unit 150 may be provided between the light guiding unit and the second display unit 140, i.e., between the light guiding unit 120 and the second display unit 140 as shown in FIG. 2.

As such, when an object approaches or touches a touch surface 131 of the first display unit 130 or a touch surface 141 of the second display unit 140, the approach or touch may be sensed by the sensor unit 150, achieving touch sensing function on both of the display units. In an embodiment of the present invention, each of the first display unit 130 and the second display unit 140 may have a thickness of less than 3 mm for more sensitive touch operation.

Figure 2:
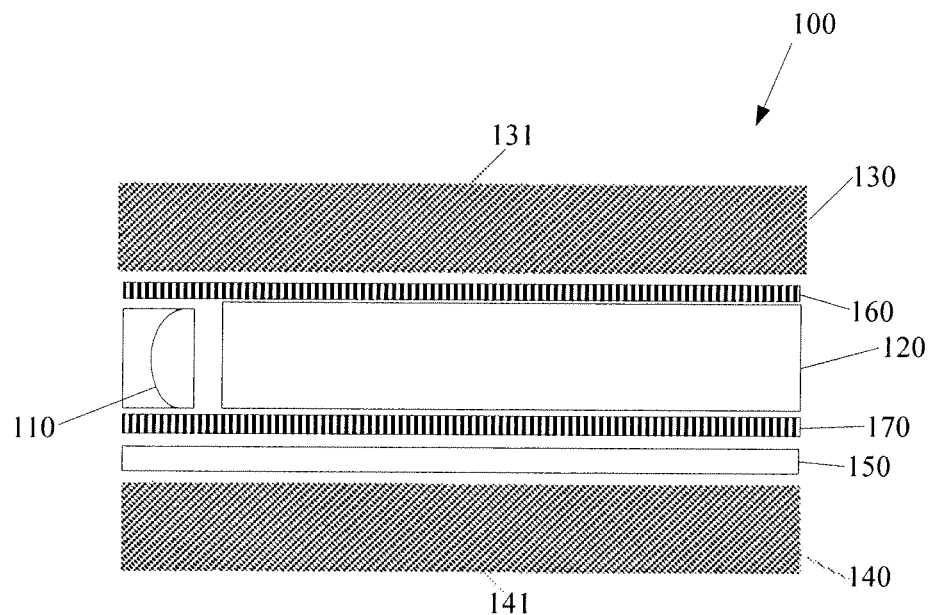
FIG. 2 is a schematic diagram of a second configuration of the display module according to the first embodiment of the present invention.

As shown in FIGS. 1 and 2, the display module 100 according to the first embodiment of the present invention may further include a first material layer 160 and a second material layer 170.

The first material layer 160 is provided on a first surface of the light guiding plate 120 towards the first direction, and has a light transmittance higher than a predetermined light transmittance in a power on state or a light transmittance lower than the predetermined light transmittance in a power off state. In other words, when the first material layer 160 is in the power on state, its light transmittance is higher than the predetermined light transmittance, e.g., it is in a transparent state, and thus most of the light reaching the first material layer 160 can pass through the first material layer 160 and travel further. When the first material layer 160 is in the power off state, its light transmittance is lower than the predetermined light transmittance, e.g., it is in an opaque state, and thus most of the light reaching the first material layer 160 cannot pass through the first material layer 160.

Further, when the first material layer 160 is in the power off state, in addition to the light transmittance lower than the predetermined light transmittance, it may have a reflectance higher than a predetermined reflectance. That is, when the first material layer 160 is in the power off state, its reflectance is higher than the predetermined reflectance, e.g., it is in a light-reflecting state, and thus most of the light reaching the first material layer 160 cannot pass through the first material layer 160, but is reflected back.

The second material layer 170 is provided on a second surface of the light guiding plate 120 towards the second direction, and has a light transmittance higher than a predetermined light transmittance in a power on state or a light transmittance lower than the predetermined light transmittance in a power off state. In other words, when the second material layer 170 is in the power on state, its light transmittance is higher than the predetermined light transmittance, e.g., it is in a transparent state, and thus most of the light reaching the second material layer 170 can pass through the second material layer 170 and travel further. When the second material layer 170 is in the power off state, its light transmittance is lower than the predetermined light transmittance, e.g., it is in an opaque state, and thus most of the light reaching the second material layer 170 cannot pass through the second material layer 170.

Further, when the second material layer 170 is in the power off state, in addition to a light transmittance lower than the predetermined light transmittance, it may have a reflectance higher than a predetermined reflectance. That is, when the second material layer 170 is in the power off state, its reflectance is higher than the predetermined reflectance, e.g., it is in a light-reflecting state, and thus most of the light reaching the second material layer 170 cannot pass through the second material layer 170, but is reflected back.

Additionally, the display module 100 can further include an adjusting unit (not shown) configured to control the power on state and the power off state of each of the first material layer 160 and the second material layer 170.

The adjusting unit is configured to control, in response to a first control command, the first material layer 160 to enter the power on state and the second material layer 170 to enter the power off state, i.e., to control the first material layer 160 to enter a light transmission state where its light transmittance is higher than the predetermined light transmittance and the second material layer 170 to enter an opaque state where its light transmittance is lower than the predetermined light transmittance. Preferably, the second material layer 170 may enter a light-reflecting state where light is reflected back at a certain reflectance. In this way, the light emitted from the light emitting unit 110 passes through the light guiding plate 120 and the first material layer 160 and reaches the first display unit 130 such that the first display unit 130 can display an image. The sensor unit 150 can sense an object's approach or touch on the touch surface 131 of the first display unit 130.

The adjusting unit is configured to control, in response to a second control command, the second material layer 170 to enter the power on state and the first material layer 160 to enter the power off state, i.e., to control the second material layer 170 to enter a light transmission state where its light transmittance is higher than the predetermined light transmittance and the first material layer 160 to enter an opaque state where its light transmittance is lower than the predetermined light transmittance. Preferably, the first material layer 160 may enter a light-reflecting state where light is reflected back at a certain reflectance. In this way, the light emitted from the light emitting unit 110 passes through the light guiding plate 120 and the second material layer 170 and reaches the second display unit 140 such that the second display unit 140 can display an image. The sensor unit 150 can sense an object's approach or touch on the touch surface 141 of the second display unit 140.

The adjusting unit according to the first embodiment of the present invention may be a switch, and respond to the first and second control commands sent from a control unit of the electronic terminal.

The above first and second material layers may a liquid crystal film sandwiched by processed glasses (e.g., semi-reflective glasses). Such material may be transmissive in the power on state, and reflective in the power off state. Compositions and characteristics of such material are known to those skilled in the art and details thereof will be omitted here.

With the display module according to the first embodiment of the present invention, light can be supplied to two display units by providing only one light emitting unit and one light guiding unit. The light irradiation requirement of the two display units can be satisfied without increasing power consumption, thereby achieving the effect of low power consumption. Moreover, the two display units are provided with only one light guiding unit. Therefore, the thickness of the display module can be further reduced, which makes the display slimmer.

According to the present invention, configuration of the display module is not limited to the above first embodiment. Various configurations can be implemented. Hence, a display module according to a second embodiment of the present invention is also provided.

Figure 3:
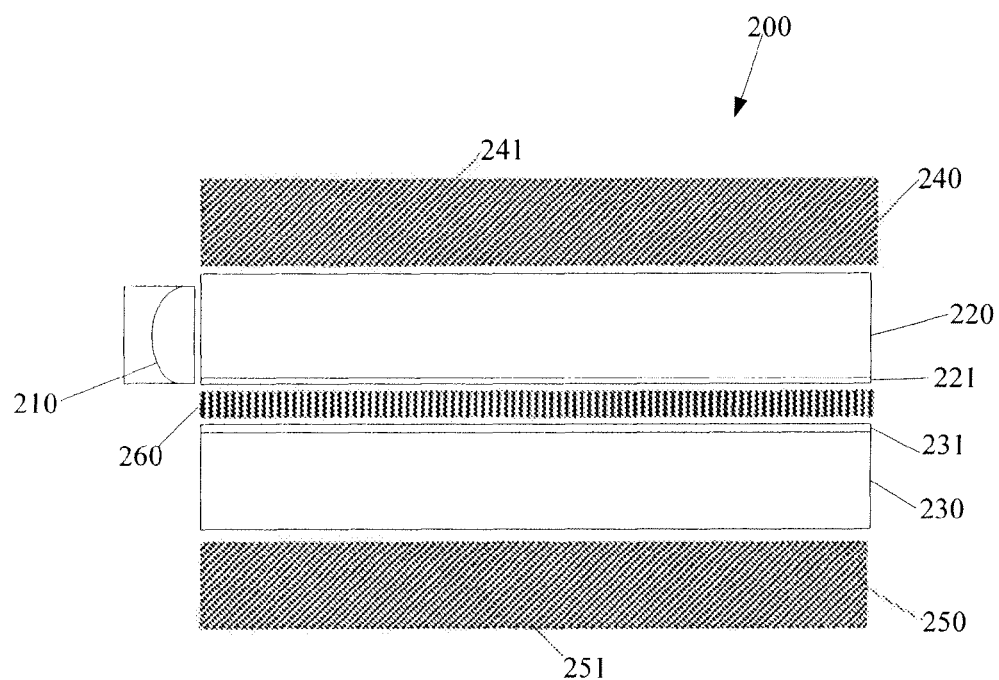
FIG. 3 is a schematic diagram of configuration of a display module according to a second embodiment of the present invention.

FIG. 3 is a schematic diagram of configuration of a display module 200 according to a first embodiment of the present invention. Referring to FIG. 3, the display module 200 according to the second embodiment includes a light emitting unit 210, a light guiding unit, a first display unit 240, a second display unit 250 and a sensor unit 260.

The light emitting unit 210 may include one or more LEDs.

The light guiding unit can include a first light guiding plate 220 and a second light guiding plate 230. The light emitting unit 210 is provided at an end surface of the first light guiding plate 220 or the second light guiding plate 230. The light emitting unit 110 faces directly the end surface of the first light guiding plate 220 or the second light guiding plate 230 such that the light emitting unit 210 emits light to an area where the end surface is located (i.e., a first area).

When the light emitting unit 210 faces the end surface of the first guiding plate 220, the light emitted from the light emitting unit 210 is transmitted to the first light guiding plate 220, which may guide the light emitted from the light emitting unit 210 towards a first direction, i.e., to a second area on a first side of the first light guiding plate 220. When the light emitting unit 210 faces the end surface of the second guiding plate 230, the light emitted from the light emitting unit 210 is transmitted to the second light guiding plate 230, which can guide the light emitted from the light emitting unit 210 towards a second direction, i.e., to a third area on a second side of the second light guiding plate 230.

The first display unit 240 is provided on a first side of the first light guiding plate 220 in the direction towards which the light is guided (i.e., the first direction).

The second display unit 250 is provided on a second side of the second light guiding plate 230 in the direction towards which the light is guided (i.e., the second direction). As shown in FIG. 3, the first direction and the second direction may be opposite directions, and the first light guiding plate 220 may be parallel to the second light guiding plate 230. A distance between the first light guiding plate 220 and the first display unit 240 is shorter than a distance between the second light guiding plate 230 and the first display unit 240. A distance between the second light guiding plate 230 and the second display unit 250 is shorter than a distance between the first light guiding plate 220 and the second display unit 250.

In the display module 200 according to the second embodiment of the present invention, as shown in FIG. 3, the sensor unit 260 is provided between the first light guiding plate 220 and the second light guiding plate 230. In this way, when an object approaches or touches a touch surface 241 of the first display unit 240 or a touch surface 251 of the second display unit 250, the approach or touch may be sensed by the sensor unit 260 to enable touch sensing function on both of the display units. In an embodiment of the present invention, each of the first display unit 240 and the second display unit 250 may have a thickness of less than 3 mm for more sensitive touch operation.

Further, the display module 200 according to the second embodiment of the present invention may include a moving mechanism 270 which is connected to the light emitting unit 210 and configured to move the light emitting unit 210 between the first light guiding plate 220 and the second light guiding plate 230.

Figure 4:
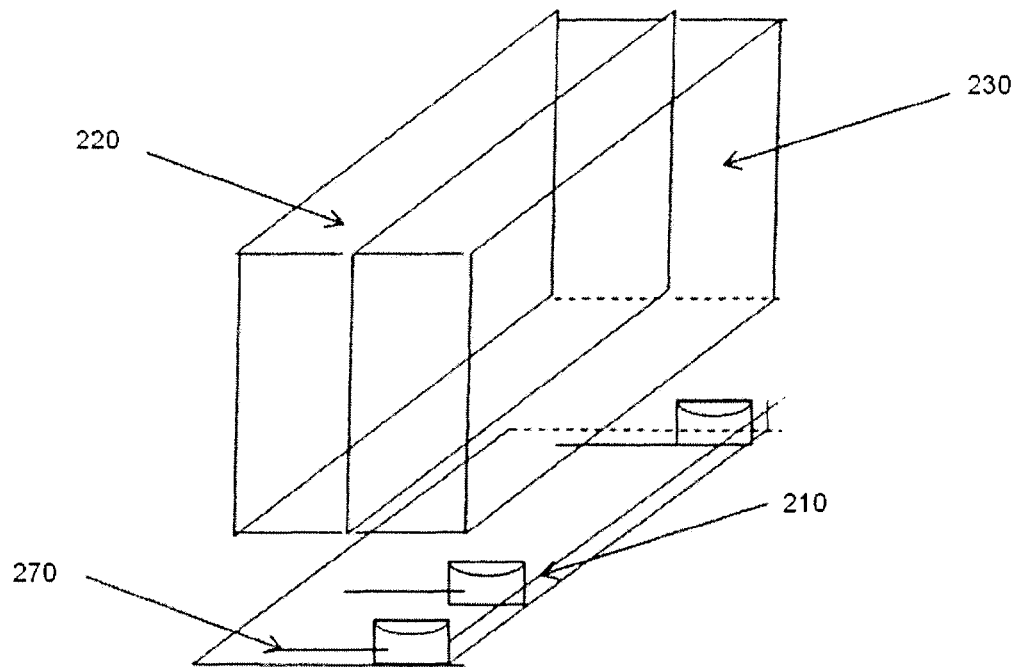
FIG. 4 is a schematic diagram showing a position relationship between each of first and second light guiding plates and a light emitting unit in the display module according to the second embodiment of the present invention.

FIG. 4 shows a position relationship between each of the first and second light guiding plates 220 and 230 and the light emitting unit 210 according to an embodiment. The light emitting unit 210 includes a number of LEDs forming a LED chain, and is provided on one side of the first light guiding plate 220 and the second light guiding plate 230. When the first light guiding plate 220 and the second light guiding plate 230 are placed vertically, the LED chain of the light emitting unit 210 is provided below the first light guiding plate 220 and the second light guiding plate 230 and is movable by the moving mechanism. While FIG. 4 shows an example in which the light emitting unit 210 is placed below the first light guiding plate 220 and the second light guiding plate 230, the present invention is not limited thereto, and the light emitting unit 210 may be placed on any side of the first light guiding plate 220 and the second light guiding plate 230.

Upon receiving a third control command, the moving mechanism 270 in response causes the LED chain to move to a first position. At the first position, the LED chain is right below the first light guiding plate 220 and faces an end surface of the first light guiding plate 220, such that the light emitted from the LED chain is guided by the first light guiding plate 220 to the first display unit 240, enabling the first display unit 240 to display an image.

Upon receiving a fourth control command, the moving mechanism 270 in response causes the LED chain to move to a second position. At the second position, the LED chain is right below the second light guiding plate 230 and faces an end surface of the second light guiding plate 230, such that the light emitted from the LED chain is guided by the second light guiding plate 230 to the second display unit 250, enabling the second display unit 250 to display an image.

Referring again to FIG. 3, in an embodiment of the present invention, a first reflecting sheet 221 and a second reflecting sheet 231 are provided between the first light guiding plate 220 and the second light guiding plate 230. With the first reflecting sheet 221, when the light emitted from the LED chain travels in the first light guiding plate 220, the light from the first light guiding plate 220 will be reflected to the first light guiding plate 220, such that the light traveling in the first light guiding plate 220 can be completely guided to the first display unit 240, thereby enabling the first display unit 240 to display an image. With the second reflecting sheet 231, when the light emitted from the LED chain travels in the second light guiding plate 230, the light from the second light guiding plate 230 will be reflected to the second light guiding plate 230, such that the light traveling in the second light guiding plate 230 can be completely guided to the second display unit 250, thereby enabling the second display unit 250 to display an image.

It can be appreciated by those skilled in the art that, instead of the two one-sided reflecting sheets, one double-sided reflecting sheet may be provided between the first light guiding plate 220 and the second light guiding plate for achieving the above function.

Additionally, the third and fourth control commands received by the moving mechanism 270 may be sent from a control unit of the electronic terminal.

It can be appreciated by those skilled in the art that the moving mechanism in the display module 200 according to the second embodiment of the present invention may be implemented in various configurations. For example, it may be implemented in a mechanism in which a slide track and a sliding block cooperate with each other. In this example, the light emitting unit may be connected fixedly to the sliding block, and a driving unit, such as a motor, drives the sliding block, so that it makes the light emitting unit move between the first light guiding plate and the second light guiding plate along the slide track.

The moving mechanism is not limited to the above configuration. Examples of other possible configurations will be omitted here.

With the display module according to the second embodiment of the present invention as described above, light can be supplied to two display units by providing only one (or one set of) light emitting unit(s). Also, the light irradiation requirement of the two display units can be satisfied without increasing power consumption, thereby achieving low power consumption.

It can be appreciated by those skilled in the art that, in the display module according to the first or second embodiment of the present invention, each of the first and second display units include a liquid crystal part and an optical film part, and the sensor unit includes a capacitive sensing layer. The configurations of these units in the display module are well known to those skilled in the art and will thus be omitted here.

According to another embodiment of the present invention, an electronic terminal having the above display module is provided. The electronic terminal includes: a host comprising at least one processing unit; a display comprising: a first display unit configured to display first image information in a first direction upon receiving a first data from a first processing unit of the at least one processing unit; a second display unit configured to display second image information in a second direction upon receiving a second data from a second processing unit of the at least one processing unit; and a sensor unit provided between the first display unit and the second display unit and configured to obtain operation data for an object's approach or touch on the first display unit and/or the second display unit and to transmit the operation data to a third processing unit of the at least one processing unit.

Here, the first, second and third processing units may be the same or different. For example, any two of the three processing units may be different from one another, or any two of them may be the same.

In the electronic terminal according to an embodiment of the present invention, each of the first processing unit sending the first data to the first display unit and the second processing unit sending the second data to the second display unit may be a Central Processing Unit (CPU) or a graphics adapter, and the third processing unit to which the operation data is transmitted from the sensor unit may be a CPU.

In particular, when the electronic terminal is implemented as a terminal having a single system, the first, second and third processing units may be of the same configuration, such as a CPU of X86 architecture. Alternatively, the first and second processing unit may be the same or different graphics adapter units, or a CPU and a graphics adapter unit respectively, and the third processing unit may be a CPU. As another example, when the electronic terminal has two systems, the first processing unit may be a CPU of X86 architecture, the second processing unit may be a CPU of ARM architecture, and the third processing unit may be a CPU of X86 or ARM architecture. The third processing unit may be selected as a CPU that runs and is capable of responding to data for touch operation.

The display further includes: a light emitting unit configured to emit light towards a first area; and a light guiding unit provided in the first area and configured to guide the light emitted from the light emitting unit to a second area corresponding to the first direction and a third area corresponding to the second direction. The first display unit is provided in the second area and configured to display the first image information with the light guided to the second area by the light guiding unit. The second display unit is provided in the third area and configured to display the second image information with the light guided to the third area by the light guiding unit.

The display module of the display may be implemented in any of the configuration shown in FIGS. 1-3. For example, when implemented in the configuration shown in FIG. 1, the light guiding unit may include a light guiding plate. The light emitting unit is provided at an end surface of the light guiding plate. The light emitting unit may face directly the end surface. The light emitted from the light emitting unit may be transmitted to the light guiding plate which may guide the light emitted from the light emitting unit towards a first direction and a second direction, such that the light guided towards the first direction irradiates a second area and the light guided towards the second direction irradiates a third area.

Additionally, the first display unit and the second display unit may be provided on a first side and a second side of the light guiding plate, respectively. The sensor unit is provided between the light guiding unit and the first display unit, or between the light guiding unit and the second display unit.

The display module may further include a first material layer provided on a first surface of the light guiding plate towards the first direction and having a light transmittance higher than a predetermined light transmittance in a power on state and a light transmittance lower than the predetermined light transmittance in a power off state; a second material layer provided on a second surface of the light guiding plate towards the second direction and having a light transmittance higher than a predetermined light transmittance in a power on state and a light transmittance lower than the predetermined light transmittance in a power off state; and an adjusting unit configured to control the power on state and the power off state of each of the first material layer and the second material layer. The adjusting unit is configured to control, in response to a first control command, the first material layer to enter the power on state and the second material layer to enter the power off state. That is, the first material layer is in a light transmission state and has a light transmittance higher than the predetermined light transmittance, whereas the second material layer is in a light-reflecting state and has a light transmittance lower than the predetermined light transmittance. In this case, the light emitted from the light emitting unit travels through the light guiding plate and the first material layer to reach the first display unit, enabling the first display unit to display an image. The sensor unit is configured to sense an object's approach or touch on the touch surface of the first display unit. The adjusting unit is configured to control, in response to a second control command, the second material layer to enter the power on state and the first material layer to enter the power off state. That is, the second material layer is in a light transmission state and has a light transmittance higher than the predetermined light transmittance, whereas the first material layer is in a light-reflecting state and has a light transmittance lower than the predetermined light transmittance. In this case, the light emitted from the light emitting unit travels through the light guiding plate and the second material layer to reach the second display unit, enabling the second display unit to display an image. The sensor unit is configured to sense an object's approach or touch on the touch surface of the second display unit.

With the display having the above configuration, when an object approaches or touches the touch surface of the first or second display unit, the approach or touch can be sensed by a single sensor unit. In addition, light can be supplied to two display units by providing only one light emitting unit and one light guiding unit. In this way, the thickness of the display module is further reduced, which makes the display slimmer while reducing manufacture cost of the display.

In the electronic terminal according to the embodiment of the present invention, the specific configuration of the display module of the display described above in conjunction with FIGS. 1-4 can be used, and thus description thereof will be omitted here.

The host of the electronic terminal can execute a first operating system and/or a second operating system. When the host executes the first operating system, the first display unit is configured to display an operation result of the first operating system in the first direction. When the host executes the second operating system, the second display unit is configured to display an operation result of the second operating system in the second direction.

When the host executes the first operating system, the sensor unit is configured to sense an object's approach or touch on the first display unit, and the first operating system responds to the approach or touch. When the host executes the second operating system, the sensor unit is configured to sense an object's approach or touch on the second display unit, and the second operating system responds to the approach or touch.

The electronic terminal having the above configuration can be switched between a first operation state in which the first operating system is a primary operating system and a second operation state in which the second operating system is the primary operating system. The electronic terminal further includes a connecting unit configured to connect the host with the display. The display has a first relative position relationship with the host when the connecting unit is in a first connection state or a second relative position relationship with the host when the connecting unit is in a second connection state. The electronic terminal further includes a detecting unit configured to detect the relative position relationship between the host and the display and to generate a first detection result upon detecting the first relative position relationship or a second detection result upon detecting the second relative position relationship; and a fourth processing unit connected to the detecting unit and configured to switch the electronic terminal to the first operation state based on the first detection result or the second operation state based on the second detection result.

The connection unit may include a rotation component, such as a rotation shaft. The display and the host may rotate about the rotation shaft with respect to each other.

The detecting unit may detect the relative position relationship between the host and the display using various schemes. In the following, two schemes will be described. However, the present invention is not limited to these schemes.

In the first scheme, the relative position relationship between the host and the display may be determined by detecting the connecting unit. That is, when the connecting unit includes a rotation component, such as a rotation shaft, a rotation shaft detection sensor may be used to detect a rotation angle or the like. For example, a switch circuit may be added to the rotation shaft and controlled in response to closing and opening of the rotation shaft. The circuit may send a signal for switching the operation state of the electronic terminal.

In the second scheme, the relative position relationship between the host and the display may be determined by detecting the display and the host (instead of detecting the connecting unit). For example, when the connecting unit includes a rotation component, such as a rotation shaft, a trigger component may be provided on a side of the display facing the host, a side of the host facing the display, or both a side of the display and a side of the host facing each other. When the display rotates about the rotation shaft to close up to the host, the component triggers switching of operation state of the electronic terminal. For example, the trigger component may be a magnet provided on the side of the display facing the host. In this case, the process of detection may be as follows. When the display rotates about the rotation shaft to close up to the host, the magnet on the display contacts a Hall element provided on the host. The Hall element senses that the magnet is approaching and sends a signal for controlling the terminal to switch its operation state. In another example, the trigger component may be an actuation switch provided on the side of the host facing towards the display. In this case, the process of detection may be as follows. When the display rotates about the rotation shaft and approaches the host to close up to the host, the actuation switch is pressed by the display, thereby triggering the electronic terminal to switch its operation state.

The fourth processing unit may be a CPU, or a standalone processing unit such as an MCU or an EC. That is, the first, second and third processing units may be the same or different. The present invention is not limited thereto.

Here, the first operation state is an operation state in which the first operating system is the primary operating system. In the first operation state, only the first operating system is running, or both of the first and second operating systems are running. However, only the operation result of the first operating system is displayed by the first display unit in this case. The second operation state is an operation state in which the second operating system is the primary operating system. In the second operation state, only the second operating system is running, or both of the first and second operating systems are running. However, only the operation result of the second operating system is displayed by the second display unit in this case.

The detecting unit of the electronic terminal detects the connection state of the connecting unit, and generates the first or second detection result. Based on the detection result of the detecting unit, the fourth processing unit switches the electronic terminal between the first operating system and the second operating system.

Here, in addition to switching between the first operating system and the second operating system, the display unit also needs to be switched. If the first and second display units are standalone display units, only power supply to the display units needs to be switched. If the display units share a common light source, a control command will be required. In the latter case, for the embodiments shown in FIGS. 1 and 2, the adjusting unit sends the first control command or the second control command, such that in the first operation state, the first material layer is in the power on state and the second material layer is in the power off state, and in the second operation state, the second material layer is in the power on state and the first material layer is in the power off state. For the embodiments shown in FIGS. 3 and 4, the adjusting unit sends the third control command or the fourth control command, such that the light emitting unit is moved to face the first light guiding plate in the first operation state, and to face the second light guiding plate in the second operation state.

Figure 5:
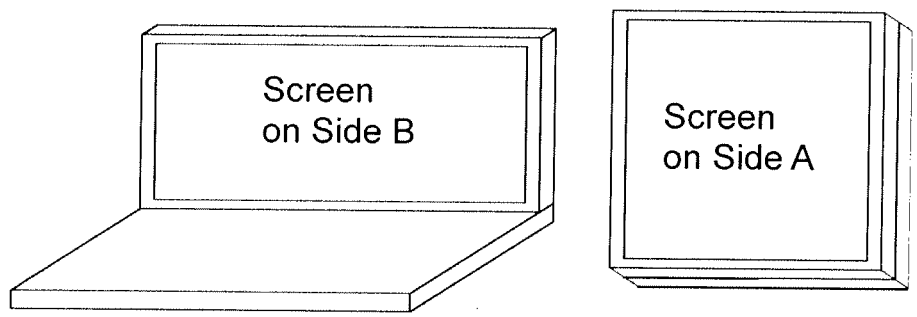
FIG. 5 is a schematic diagram of configuration of an electronic device according to an embodiment of the present invention.

FIG. 5 is a schematic diagram of configuration of an electronic device according to an embodiment of the present invention. The electronic terminal is a notebook computer having two screens. In this notebook computer, a display screen (i.e., the first display unit) is added on an outer surface (Side A) of the display case for displaying first image information, and a display screen (e.g., the second display unit) provided on an inner surface (Side B) of the display case is used to display second image information. Each of the first and second display units is configured as a touch screen. The two display units share a common sensor unit which is provided between the first display unit and the second display unit.

The electronic terminal shown in FIG. 5 is provided with two display units and capable of executing two different operating systems.

If the electronic terminal has two different hardware systems, such as an X86 platform and an ARM platform, when the display is opened with respect to the host, a Windows operating system, for example, may run on the X86 platform, and the display screen on Side B (i.e., the second display unit) may be used as the display for outputting. In this case the operation state is similar to that of a traditional notebook computer. When the display is close up to the host, the hardware system is automatically switched to the ARM platform running, for example, an Android operating system, and the display screen on Side B (i.e., the first display unit) is used as the display for outputting. The notebook computer in this operation state is similar to a tablet computer (e.g., Pad) executing the Android operating system. Additionally, the display screen on Side A or B of the display may be a touch screen. The two display screens share a common sensor unit provided between them.

If the electronic device has one hardware system, such as an ARM platform, when the display is opened with respect to the host, a Windows operating system, for example, may run on the ARM platform (e.g., a Windows operating system for the ARM platform), and the display screen on Side B may be used as the display for outputting. When the display is close up to the host, e.g., an Android operating system may run on the ARM platform, and the display screen on Side A can be used as the display for outputting.

Alternatively, if the electronic device has one hardware system, such as an X86 platform, when the display is opened with respect to the host, a Windows operating system, for example, may run on the X86 platform, and the display screen on Side B may be used as the display for outputting. When the display is close up to the host, an Android operating system, for example, may run on the X86 platform (e.g., an Android operating system running on a virtual machine), and the display screen on Side A may be used as the display for outputting.

In the electronic terminal having the configuration shown in FIG. 5, a detecting unit may be provided to control the electronic terminal to switch between two operating systems by detecting a connection state between the host and the display. A connecting unit, such as a rotation shaft, may be provided between the host and the display. The display is controlled, by rotating the rotation shaft, to be opened or close up to the host, enabling switching of the electronic terminal between the first and second operation states.

For example, when the display is close up to the host, the angle between the display and the host is smaller than a predetermined angle, the electronic terminal is switched to the first operation state, and the display screen on Side A (i.e., the first display unit) is used to display the operation result of the first operating system. When the display is opened with respect to the host, the angle between the display and the host is larger than the predetermined angle, the electronic terminal is switched to the second operation state, and the display screen on Side B (i.e., the second display unit) is used to display the operation result of the second operating system. If the first operating system runs on the ARM platform and the second operating system runs on the X86 platform, the electronic terminal may be switched between the ARM platform and the X86 platform based on the relative position relationship between the display and the host as detected by the detecting unit, and executes different operating systems on these two platforms.

The electronic terminal may include two hardware systems (or platforms), for example, a first hardware system such as an ARM platform including a processor of ARM architecture and a second hardware system such as an X86 platform including a processor of X86 architecture. A touch sensing unit may be connected with these two hardware systems (or platforms) via a physical or logical switch, which may connected with the processor of ARM architecture and the processor of X86 architecture directly or indirectly.

The first operation state is a state in which the first operating system runs and the first display unit is used for displaying. In this case, the first display unit operates and displays the operation result of the first operating system. The switch connects the touch sensing unit to the processor of ARM architecture. The touch operation data collected by the touch sensing unit is sent to the processor of ARM architecture for processing, and the processing result is displayed by the first operating system.

The second operation state is a state in which the second operating system runs and the second display unit is used for displaying. In this case, the second display unit operates and displays the operation result of the second operating system. The switch connects the touch sensing unit to the processor of X86 architecture. The touch operation data collected by the touch sensing unit is sent to the processor of X86 architecture for processing, and the processing result is displayed by the second operating system.

When the electronic terminal includes one hardware system (or platform), the touch sensing unit may be connected to the hardware system (or platform), that is, connected to the processor directly or indirectly.

The first operation state is a state in which the first operating system runs and the first display unit is used for displaying. In this case, the first display unit operates and displays the operation result of the first operating system. The touch operation data collected by the touch sensing unit is sent to the processor for processing, and the processing result is displayed by the first operating system.

The second operation state is a state in which the second operating system runs and the second display unit is used for displaying. In this case, the second display unit operates and displays the operation result of the second operating system. The touch operation data collected by the touch sensing unit is sent to the processor for processing, and the processing result is displayed by the second operating system.

Moreover, according to an embodiment of the present invention, the electronic terminal may include two processing units that execute the first and second operating systems, respectively. For example, the first processing unit is configured to execute the first operating system and the second processing unit is configured to execute the second operating system. The first processing unit has lower performance or power consumption than the second processing unit. For example, the first processing unit may be a processor of ARM architecture, and the second processing unit may be a processor of X86 architecture. The processors do not necessarily have different performances or power consumptions. The processors having the same performances and power consumptions may also be used.

Alternatively, the electronic terminal may include only one processing unit for executing the first and second operating systems.

In the electronic terminal, the first processing unit, a first memory unit storing the first operating system and other associated hardware for supporting the execution of the first operating system may be provided within the display, and the second processing unit, a second memory unit (which can be different from the first memory unit) storing the second operating system and other associated hardware for supporting the execution of the second operating system may be provided within the host. In this case, the display and the host are two independent systems (including hardware and software systems).

For example, the first operating system may be an operating system for mobile internet devices, such as Android, WinCE, iOS, Symbian, Megoo or Blackberry OS, and the second operating system may be an operating system for traditional computers, such as Windows, Linux, Mac OS or Chrome OS.

The solutions of the present invention have been described in detail by taking a notebook computer as an example. However, in addition to a notebook computer, the present invention may also be applied to any other appropriate terminal such as a clamshell cell phone.

With the electronic terminal, an object's approach or touch on the first display unit and the second display unit can be sensed by a single sensor unit. There is no need to provide a sensor unit for each of the display units for touch sensing function. In this way, it is possible to reduce the thickness of the display module, make it slimmer and more beautiful while reducing manufacture cost. Further, with the two display units, the electronic terminal can be switched between a first operation state in which the first operating system is the primary operating system and a second operation state in which the second operating system is the primary operating system. Therefore, the terminal can be switched between different states seamlessly.

While the present invention has been described above with reference to the embodiments, it can be appreciated by those skilled in the art that various improvements and modifications can be made without departing from the principle of the present invention and these improvements and modifications are to be encompassed by the scope of the present invention.

What is claimed is:
1. A display module, comprising:
 a first display unit configured to display first image information in a first direction;
 a second display unit configured to display second image information in a second direction;
 a sensor unit provided between the first display unit and the second display unit and configured to sense an object's approach or touch on the first display unit and/or the second display unit;
 a light emitting unit configured to emit light; and a light guiding plate provided between the first display unit and the second display unit, wherein the light emitting unit is provided at an end surface of the light guiding plate, and the light guiding plate is configured to guide the light emitted from the light emitting unit to the first or second display unit;

wherein a first material layer is provided on a first surface of the light guiding plate towards the first direction, and has a light transmittance higher than a predetermined light transmittance in a power on state and a light transmittance lower than the predetermined light transmittance in a power off state; and a second material layer is provided on a second surface of the light guiding plate that faces towards the second direction, and has a light transmittance higher than a predetermined light transmittance in a power on state and a light transmittance lower than the predetermined light transmittance in a power off state;

wherein the display module further comprises an adjusting unit configured to control the power on state and the power off state of each of the first material layer and the second material layer, wherein the adjusting unit is configured to in response to the display module being opened with respect to a host, control the first material layer to enter the power on state, the second material layer to enter the power off state and thus the light guiding plate to guide the light emitted from the light emitting unit to the first display unit, so that the first display unit is used to display the first image information with the light guided by the light guiding plate, and in response to the display module being closed up with respect to the host, control the first material layer to enter the power off state, the second material layer to enter the power on state and thus the light guiding plate to guide the light emitted from the light emitting unit to the second display unit, so that the second display unit is used to display the second image information with the light guided by the light guiding plate.

2. The display module of claim 1, wherein the sensor unit is provided between the light guiding unit and the first display unit, or between the light guiding unit and the second display unit.

3. An electronic terminal, comprising:
a host comprising at least one processing unit; and
a display comprising:
a first display unit configured to display first image information in a first direction upon receiving a first data from a first processing unit of the at least one processing unit;
a second display unit configured to display second image information in a second direction upon receiving a second data from a second processing unit of the at least one processing unit;
a sensor unit provided between the first display unit and the second display unit and configured to obtain operation data for an object's approach or touch on the first display unit and/or the second display unit and to transmit the operation data to a third processing unit of the at least one processing unit;
a light emitting unit configured to emit light; and
a light guiding plate provided between the first display unit and the second display unit, wherein the light emitting unit is provided at an end surface of the light guiding plate, and the light guiding plate is configured to guide the light emitted from the light emitting unit to the first or second display unit;

wherein a first material layer is provided on a first surface of the light guiding plate towards the first direction, and has a light transmittance higher than a predetermined light transmittance in a power on state and a light transmittance lower than the predetermined light transmittance in a power off state; and a second material layer is provided on a second surface of the light guiding plate that faces towards the second direction, and has a light transmittance higher than a predetermined light transmittance in a power on state and a light transmittance lower than the predetermined light transmittance in a power off state;

wherein the display further comprises an adjusting unit configured to control the power on state and the power off state of each of the first material layer and the second material layer, wherein the adjusting unit is configured to in response to the display module being opened with respect to the host, control the first material layer to enter the power on state, the second material layer to enter the power off state and thus the light guiding plate to guide the light emitted from the light emitting unit to the first display unit, so that the first display unit is used to display the first image information with the light guided by the light guiding plate, and in response to the display module being closed up with respect to the host, control the first material layer to enter the power off state, the second material layer to enter the power on state and thus the light guiding plate to guide the light emitted from the light emitting unit to the second display unit, so that the second display unit is used to display the second image information with the light guided by the light guiding plate.

4. The electronic terminal of claim 3, wherein the sensor unit is provided between the light guiding unit and the first display unit, or between the light guiding unit and the second display unit.

5. The electronic terminal of claim 3, wherein the host is configured to execute a first operating system and/or a second operating system,
when the host executes the first operating system, the first display unit is configured to display an operation result of the first operating system in the first direction, and
when the host executes the second operating system, the second display unit is configured to display an operation result of the second operating system in the second direction.

6. The electronic terminal of claim 5, wherein
when the host executes the first operating system, the sensor unit is configured to sense the object's approach or touch on the first display unit, and the first operating system responds to the object's approach or touch, and
when the host executes the second operating system, the sensor unit is configured to sense the object's approach or touch on the second display unit, and the second operating system responds to the object's approach or touch.

7. The electronic terminal of claim 5, further comprising:
a connecting unit configured to connect the host with the display, wherein the display has a first relative position relationship with the host when the connecting unit is in a first connection state or a second relative position relationship with the host when the connecting unit is in a second connection state;

a detecting unit configured to detect the relative position relationship between the host and the display, and to generate a first detection result upon detecting the first relative position relationship or a second detection result upon detecting the second relative position relationship; and a fourth processing unit of the at least one processing unit, connected to the detecting unit and configured to switch the electronic terminal to a first operation state based on the first detection result or a second operation state based on the second detection result, wherein the first operation state is an operation state in which the first operating system is a primary operating system and the first display unit displays the operation result of the first operating system, and the second operation state is an operation state in which the second operating system is the primary operating system and the second display unit displays the operation result of the second operating system.

* * * * *